(12) United States Patent
Dubrovsky

(10) Patent No.: US 8,449,931 B2
(45) Date of Patent: May 28, 2013

(54) CHEWING GUM COMPOSITION

(76) Inventor: Michael Dubrovsky, Richmond, CA (US)

( * ) Notice: Subject to any disclaimer, the term of this patent is extended or adjusted under 35 U.S.C. 154(b) by 1816 days.

(21) Appl. No.: 11/511,595

(22) Filed: Aug. 28, 2006

(65) Prior Publication Data

US 2008/0050468 A1   Feb. 28, 2008

(51) Int. Cl.
*A23G 4/00*  (2006.01)
*A23G 4/08*  (2006.01)

(52) U.S. Cl.
USPC ........................ 426/6; 426/3; 426/4

(58) Field of Classification Search
CPC .................................. A23G 4/00; A23G 4/08
USPC ................................... 426/3, 4, 6
See application file for complete search history.

(56) References Cited

U.S. PATENT DOCUMENTS

| | | | |
|---|---|---|---|
| 3,285,750 A | | 11/1966 | Ishida et al. |
| 4,299,789 A | * | 11/1981 | Giesbrecht ............... 264/211.12 |
| 4,332,698 A | * | 6/1982 | Bernstein et al. ................. 502/4 |
| 4,351,822 A | | 9/1982 | Allen |
| 4,357,355 A | | 11/1982 | Koch et al. |
| 4,358,396 A | * | 11/1982 | Bernstein et al. ............. 502/159 |
| 4,439,578 A | | 3/1984 | Kim et al. |
| 4,525,363 A | * | 6/1985 | D'Amelia et al. ................ 426/3 |
| 4,582,707 A | | 4/1986 | Calabro |
| 4,794,003 A | * | 12/1988 | Cherukuri et al. ................ 426/6 |
| 4,802,924 A | | 2/1989 | Woznicki |
| 4,872,884 A | | 10/1989 | Cherukur et al. |
| 4,938,952 A | * | 7/1990 | Kamen et al. .................... 424/63 |
| 4,976,904 A | | 12/1990 | Bilhorn |
| 5,093,110 A | * | 3/1992 | Kamen et al. .................... 424/63 |
| 5,110,607 A | | 5/1992 | Yang |
| 5,110,608 A | | 5/1992 | Cherukuri et al. |
| 5,113,860 A | | 5/1992 | McQuinn |
| 5,116,627 A | | 5/1992 | Rutherford et al. |
| 5,416,156 A | * | 5/1995 | Kamen ......................... 524/520 |
| 5,525,361 A | * | 6/1996 | Hightower ........................ 426/3 |
| 5,824,291 A | | 10/1998 | Howard |
| 6,190,706 B1 | | 2/2001 | Bunczek et al. |
| 6,613,106 B1 | | 9/2003 | Debe et al. |
| 2003/0008198 A1 | | 1/2003 | Mukoyama et al. |
| 2003/0013774 A1 | | 1/2003 | Mukoyama et al. |
| 2004/0247669 A1 | | 12/2004 | Gin et al. |

OTHER PUBLICATIONS

Int. Search Rep. For PCT/US07/18921, filed Aug. 28, 2007, mailed Feb. 27, 2008, 8 pgs.

* cited by examiner

*Primary Examiner* — Humera Sheikh
*Assistant Examiner* — Hong T Yoo
(74) *Attorney, Agent, or Firm* — Squire Sanders (US) LLP

(57) ABSTRACT

The present invention relates to a chewing gum base formulation comprising a biocompatible particulate polymer having an average particle size of from about 200 μm to about 2000 μm wherein the polymer fibrillates when subjected to a shear stress such as that encountered during chewing.

11 Claims, No Drawings

CHEWING GUM COMPOSITION

FIELD

The current invention relates to the field of confectioneries, in particular chewing gums.

BACKGROUND

Chewing gum has a rich history; in fact it appears to literally predate history. Archeologists have discovered evidence that prehistoric men and women apparently chewed on lumps of tree resin for pure enjoyment. More "recently," the ancient Greeks were known to chew mastiche, a chewing gum made from the resin of the mastic tree. In the Americas, the Mayans chewed chicle, the sap of the sapodilla tree and the North American Indians chewed the sap of spruce trees, passing the habit along to settlers.

The modern incarnation of chewing gum, however, began in the 1880s with the introduction of Chiclets by the Freer brothers followed shortly by the Curtis brothers who in 1848 became the first to actually sell chewing gum.

Until the late 1870s, chewing gum had little, if any, flavor, an oversight that was corrected by John Colgin, a Kentucky druggist, who for the first time added sugar to chicle. As a result, the course of chewing gum through history was forever set.

It was not until 1928, however, that a truly commercial bubble gum entered the marketplace as the result of a serendipitous event that brought Walter Diemer, an accountant for the Freer gum company, into contact with bubble gum formulation, which fascinated him to the extent that, without any training, he preceded to experiment for several months until eventually he hit on a formulation that become perhaps the most recognized name in bubble gum—Dubble Bubble.

Chewing gum is something of an oddity among confections: not only is it pleasurable to partake of, it also has been associated with a number of health benefits. It stimulates saliva production which has been associated with reduction of bacterial activity in the mouth, reduction in halitosis or "bad breath" and alleviation of digestive difficulties in people with ulcers or those having an excess of acidity in the digestive tract. Chewing gum has even been associated with improved memory according to some studies in which gum-chewers scored 25% higher than a control group on immediate word recall tests and 36% higher on delayed recall tests. Chewing gum has also been indicted as a means for counteracting the irritation caused by changes in air pressure during air travel.

It has been estimated that over $2 billion is spent on chewing gum each year in the United States alone.

The market for chewing gum being what it is, it comes as no surprise that considerable effort is being expended by manufacturers of the confection to improve their product. Among the properties being explored areas for potential improvement are flavor quality and persistence, mouth-feel and perhaps its most notorious characteristic, adhesion to surfaces.

The current invention provides a chewing gum base for use in the manufacture of either regular or bubble gum where the gum base can be used ab initio to make a chewing gum product or can be added to existing chewing gum formulations. The chewing gum base of the current invention provides chewing gums that exhibit superior mouth-feel, controlled firmness, controlled adhesion and other desirable properties.

SUMMARY

Thus, in one aspect, the present invention relates to a chewing gum base, comprising a biocompatible particulate polymer having an average particle size of from about 200 μm to about 2,000 μm, wherein the particles fibrillate when subjected to a shear stress.

In an aspect of this invention, the shear stress is imposed by chewing a gum comprising the chewing gum base.

In an aspect of this invention, the shear stress is imposed by mechanical means during manufacture of a gum comprising the chewing gum base.

In an aspect of this invention, the particle size is from about 300 μm to about 1,000 μm.

In an aspect of this invention, the biocompatible particulate polymer comprises from about 0.1 wt % to about 20 wt % of the base.

In an aspect of this invention, the biocompatible particulate polymer comprises from about 0.2 wt % to about 10 wt % of the base.

In an aspect of this invention, the biocompatible particulate polymer comprises from about 0.2 wt % to about 4 wt % of the base.

In an aspect of this invention, the biocompatible particulate polymer is a fluoropolymer.

In an aspect of this invention, the fluoropolymer is poly(tetrafluoro-ethylene).

An aspect of this invention is a chewing gum, comprising the chewing gum base of claim 1.

In an aspect of this invention, the chewing gum is regular chewing gum.

In an aspect of this invention, the chewing gum is bubble gum.

In an aspect of this invention, a layer of the chewing gum base of claim 1 is disposed over at least a portion of a surface of a commercial chewing gum formulation.

In an aspect of this invention, a bolus of the chewing gum base of claim 1 is disposed over or into a surface of a commercial chewing gum formulation.

An aspect of this invention is a method, comprising:
providing a chewing gum base polymer or mixture of polymers;
adding to the chewing gum base polymer or mixture of polymers from about 5 wt % to about 25 wt % of a biocompatible particulate polymer that fibrillates when subjected to a sheer force;
applying a shear force to the mixture of chewing gum base polymer or mixture of polymers and the biocompatible particulate polymer to form a substantially homogeneous dispersion of fibrillated biocompatible polymer in the chewing gum base polymer or mixture of polymers.

In an aspect of this invention, in the above method, the chewing gum base polymer is poly(vinyl alcohol).

In an aspect of this invention, in the above method, the biocompatible particulate polymer is a fluoropolymer.

In an aspect of this invention, in the above method, the fluoropolymer is poly(tetrafluoroethylene).

In an aspect of this invention, in the above method, the shear force is supplied by a roller mill.

In an aspect of this invention, in the above method, the roller mill is a Hollander beater.

In an aspect of this invention, the above method further comprises disposing a layer of the substantially homogeneous dispersion over at least a portion of a surface of a commercial chewing gum formulation such that the wt % of fibrillated biocompatible polymer is from about 0.2 wt % to about 10 wt % of the total weight of shaped commercial gum formulation plus the substantially homogeneous dispersion.

In an aspect of this invention, in the above method, the wt % of fibrillated biocompatible polymer is from about 0.2 wt % to about 4 wt %.

In an aspect of this invention, the method herein further comprises disposing a bolus of the substantially homogeneous dispersion on or into a surface of a commercial chewing gum formulation such that the wt % of fibrillated biocompatible polymer is from about 0.2 wt % to about 10 wt % of the total weight of shaped commercial gum formulation plus the substantially homogeneous dispersion.

In an aspect of this invention, the wt % of the fibrillated biocompatible polymer is from about 0.2 wt % to about 4 wt %.

DETAILED DESCRIPTION

As used herein, "chewing gum base" refers the essentially water insoluble mixture of substances that provides chewing gum with its chewing consistency and mouth-feel. For the purposes of this invention a "chewing gum base" includes both entirely novel bases prepared using mixtures of any, some or all of the various ingredients discussed below as well as others known in the art but not expressly set forth herein, to known commercial gum bases, of which the actual composition is often maintained as a trade secret, and to any commercial gum base that may be developed by any party in the future. In other words, the fibrillating particulate polymer of this invention may be used in a novel entirely ab initio gum base formulation or it may simply be added to a commercial formulation.

Historically, chewing gum base was made primarily from naturally-occurring resins such as, without limitation, leche, caspi, tunu, sorva, nispero, jelutong, guayle, perillo, gutta percha, gutta kataiu, chilte, gufta hang kang, chiquibul, massaranduba, balta, rosidinha and chicle. Of these, chicle still finds considerable use in chewing gum bases. As for the others, due not only to the fact that they have become scarce and their prices prohibitive but also to advances in the chemical arts, synthetic polymers have supplanted them as ingredients of chewing gum base. It has additionally been found that synthetic polymers can overcome some of the inherent shortcoming of the natural products and provide gums with longer-lasting flavor, improved texture and reduced tackiness. Examples of polymers that can be used in chewing gum bases include, without limitation, styrene-co-butadiene copolymer, polyisobutylene, polyisoprene, isobutylene-co-isoprene copolymer, polyvinyl acetate, polyvinyl butyl ester, vinyl ester-vinyl ether copolymers, polyethylene, ethylene-co-vinyl acetate copolymer, vinyl acetate, polyvinyl alcohol, vinyl alcohol copolymers, vinyl acetate-co-vinyl laurate copolymer, wood rosin esters and mixtures of any of the preceding.

A chewing gum base may also contain a number of additional components such as, again without limitation, plasticizers, softeners, waxes, antioxidants, colorants and inorganic fillers.

Plasticizers are added to chewing gum bases to vary the firmness of the gum base and include such compounds as, without limitation, glycerol or pentaerytritol esters of partially hydrogenated rosin, methyl esters of rosin and the like or synthetic plasticizers such as terpene resins derived from α-pinene, β-pinene, d-limonene and mixtures thereof.

Softeners are generally used to modify the texture of the gum base although in some cases they serve dual a purpose, both modifying the texture and acting as emulsifiers to render hydrophobic and hydrophilic components of the gum base miscible. Softeners include such compounds as, without limitation, hydrogenated and non-hydrogenated vegetable oil; mono-, di- and triglycerides, fatty acids such as, without limitation, stearic, oleic, linoleic and linolenic acid; cocoa butter, lard, acetylated mono-, di- and triglycerides, glycerol monostearate, glycerol triacetate and lecithin.

Waxes can be added to a gum base to aid in the curing of the final gum product and to improve the texture, shelf-life and flavor-releasing properties of the gum. Suitable waxes include, without limitation, natural waxes such as carnuba, beeswax, candelilla, rice bran, etc., and synthetic waxes such as microcrystalline paraffin and polymethylenes (Fischer-Tropsch waxes).

Antioxidants protect oxygen-sensitive components of gum such as fats and flavor oils and generally contribute to the shelf-life of the gum. Suitable antioxidants include, without limitation, tocopherols, β-carotene, butylated hydroxyanisole (BHA), butylated hydroxytoluene (BHT), vitamin C and propyl gallate.

Colorants that may be used in a gum base include any FDA-approved coloring substance and include, without limitation, plant extracts, fruit and vegetable extracts, synthetic FD&C colorants and titanium dioxide.

Inorganic fillers aid in texturing the gum and include, without limitation, calcium carbonate, aluminum hydroxide, alumina, alumina silicates, magnesium carbonate, dicalcium phosphate, talc, magnesium trisilicate, magnesium hydroxide and silica gel.

In addition to the relatively water insoluble materials that comprise the chewing gum base, a finished chewing gum product also generally includes a number of water soluble components that may include additional softeners, sweeteners, flavoring agents and combinations of these.

Water-soluble softeners that may be added to enhance chewability and mouth feel of a gum, include, without limitation, glycerin and lecithin.

Sweeteners include sugars, sugarless sweeteners or artificial sweeteners. Sugar sweeteners include, without limitation, fructose, sucrose, dextrose, maltose, levulose, galactose, dextrin, invert sugar and corn syrup. Sugarless sweeteners include, without limitation, sorbitol, mannitol, erythritol, xylitol, maltitol and the like. Artificial sweeteners include, without limitation, aspartame, sucralose, saccharine, cyclamic acid, glycyrrhizinate, dihydroxychalcones, thaumatin, monellin and the like.

Flavoring agents include, without limitation, essential oils, synthetic oils and combinations thereof. Flavorings may be obtained from such sources as plants and fruits. A few non-limiting flavorings include citrus oils, fruit essences, peppermint oil, spearmint oil, anise and oil of wintergreen.

In addition to the above gum base and soluble additives that comprise essentially all gums, other ingredients may optionally be added to give a finished chewing gum product containing substances such as, without limitation, whitening agents, nutritional supplements, breath freshening agents, coolants, smoking alternative agents such as nicotine, medicaments/pharmaceuticals, and weight loss agents.

As used herein, a "chewing gum" refers to a final product that comprises a chewing gum base with all desired additives including, of course, a particulate fibrillating polymer of this invention, and that is ready for packaging, sale and consumption by the public.

As used herein, a "commercial chewing gum formulation" refers to a composition comprising a commercial chewing gum base and all of the additives that normally comprise that commercial chewing gum except for a dusting with a powdery substance such as mannitol, which is generally applied as one of the final steps in the manufacturing process to reduce tackiness and stickiness of the processed gum. Further, as used herein the "commercial chewing gum formulation" will be at the stage of its manufacture that just precedes, coincides with or is just after the bulk gum formulation is shaped into a desired configuration for packaging. For example without limitation, for the purposes of this invention, if the desired final shape of a gum is the well-known "stick of gum," the stage of manufacture that comprises a commercial chewing gum formulation is anytime after the bulk gum has been rolled out into sheets of the desired stick thickness.

Any of the above substances and any combination thereof may be used in the manufacture of a chewing gum base or a chewing gum of this invention.

As used herein, a "biocompatible polymer" refers to a polymer or copolymer that both in its intact, natural or as-synthesized state is not toxic to living tissue, does not, or at least minimally and reparably, injure living tissue and does not, or at least minimally and controllably, cause any sort of reaction, such as an immunological reaction, in living tissue. As use herein, the decomposition of degradation products or a polymer must also exhibit the foregoing characteristics for the polymer to be considered a "biocompatible polymer" for the purposes of the present invention. Presently preferred biocompatible polymers include those listed by the federal food and drug administration (FDA) as being safe for human consumption.

As used herein, a "particulate polymer" refers to a polymer that in the dry state exists as discrete particles, which particles may be of any shape. For example, without limitation, the individual particles may be regular in shape, that is, without limitation, spherical, ellipsoidal or polygonal or they may be randomly shaped. For the purposes of this invention, suitable particulate polymers are generally prepared during the polymerization process, most often by emulsion-type polymerization in which the conditions are carefully monitored to prevent agglomeration of the particles as they form. Such emulsion polymerization processes are well-known to those skilled in the art. Presently preferred particulate polymers for this invention are the so-called "fine powder" fluoropolymers such as those offered by DuPont and others.

By "average particle size" is meant that the individual particles of a polymer of this invention have a diameter, if spherical or nominally so, or a longest dimension if randomly shaped, that group in Gaussian fashion around the stated size. For example, if an average particle size is stated to be about 200 micrometers ($\mu m$), it means that if each individual particle in a mass of particles were sized, the sizes would fit a Gaussian distribution (sometimes referred to as "normal distribution") curve with its apex at about 200 $\mu m$. By "about" is meant that the apex need not be exactly 200 $\mu m$; rather it may vary by as much as 15% from the given value, in the example given, the average size would be between 170 $\mu m$ and 230 $\mu m$.

For the purposes of this invention, the average particle size of a particulate polymer is from about 200 $\mu m$ to about 2,000 $\mu m$, preferably at present from about 300 $\mu m$ to about 1,000 $\mu m$. Presently preferred commercial particulate polymers that have the desired average particle size are DuPont poly(tetrafluoroethylene)s (PTFEs) 60, 6C, 60A, 62, 600A, 602A, 610A, 612A, 613A, 614A and 640. With regard to particle size, it is noted that polymer particles smaller than about 200 $\mu m$, while they may fibrillate, do not form fibrils having dimensions appropriate to produce the effects disclosed and claimed in this invention.

As used herein, "fibrillate" refers to the property of some particulate polymers to form microscopic elongate fibrils when subjected to a shear force. The fibrils can intertwine to form masses similar to, by way of analogy only, pads of steel wool, and by virtue of this characteristic, impart desirable properties on a gum base of this invention. The requisite shear force may be applied by the end user, the gum-chewer, as the result of the chewing action itself. In such case the chewing gum base of this invention comprises the polymer herein still in its particulate form. Alternatively, the shear force may be applied during the manufacturing process to provide a chewing gum base in which the particulate polymer of this invention is already it a fibrillate form. Presently preferred fibrillating particulate polymers for the purposes of this invention are the DuPont fine powder fluorocarbon polymers mentioned above.

As used herein, weight percent or "wt %" simply refers to the weight of a substance divided by the total weight of the mass of material of which the substance is a part.

As used herein, a "fluoropolymer" refers to paraffinic (carbon and hydrogen only) polymer in which some or all of the hydrogens have been replaced by fluorine. Examples of fluoropolymers include, without limitation, poly(tetrafluoroethylene), poly(hexafluoropropylene) and poly(vinylidene fluoride). Presently preferred for the purpose of this invention is poly(tetrafluoroethylene).

As use herein, a chewing gum base of this invention that is described as a layer "disposed over" a commercial chewing gum formulation refers to a relatively thin coating of the base applied to a surface of the commercial formulation after it has been shaped into a desired end-product configuration, e.g., without limitation, a flat sheet that will be cut into "sticks" of gum for packaging. The layer of chewing gum base may be disposed over the commercial formulation before, during or after the shaped gum is actually cut into individual pieces. "Disposed over" may, however, also refer to the application of the thin layer of a chewing gum base herein atop an intervening layer that has been applied to the commercial formulation to aid in adhesion of the gum base to the commercial formulation.

In addition to thin layers of a gum base of this invention being disposed over a surface of the shaped commercial gum formulation, a discrete mass, referred to herein as a "bolus," of the gum base may be disposed onto, or imbedded in, a surface of a commercial gum formulation.

As used herein, a "chewing gum base polymer of mixture of polymers" refers to any of or any combination of the natural or synthetic polymers discussed above as well as any that might come into use as chewing gum bases in the future.

As used herein, a "shear force" refers to a force that distorts rather than extends a body to which it is applied. With regard to the particulate polymers of this invention, a shear force would be applied as a sliding force applied to opposing surfaces of a particle rather than an opposite-direction pulling force applied at those points (i.e., an extending force).

As used herein a "substantially homogeneous dispersion" refers to a mixture of fibrils formed from a polymer of this invention wherein a sample taken at any point in the mixture will contain substantially the same wt % of fibrils as that in a sample taken at any other point in the mixture. By "substantially" is meant that the wt % of the various samples need not be, and in fact likely would not be, exactly the same; rather the wt % between individual samples can vary by as much as 20% so long as, were a sufficiently large number of samples be taken and measured, their weighs would tend to form a Gaussian distribution around a single discrete wt %.

As used herein, a "roller mill" refers to a device for reducing the size of particles by means of two or more juxtaposed rollers with spaces between them dictated by the size particle being created. Roller mills use a combination fo forces and design features to achieve particle size reduction. If all the rollers rotate at the same speed, compression is the primary force. If the rollers move at different speeds, shear force and compression are involved. If the rollers are grooved, a tearing or grinding component is added to the previous forces. Roller mills, which generally operate at relatively slow speeds, do not create much in the way of fines, very small particles not in the desired size range, and further, do not create much heat which may be detrimental to the material being milled.

A presently preferred roller mill for the purposes of this invention is the Hollander beater, a well-known device particularly in the paper-making industry. Briefly, a Hollander beater is comprised of a rotating, ribbed drum that is located in close proximity to a stationary flat surface such that the material to be milled passed between the drum and the plate and is thereupon reduced in size. The Hollander beater relies primarily on compression and shear to accomplish its purpose.

A finished product chewing gum comprising a chewing gum base of the present invention will exhibit superior firmness, texture, mouth-feel and controlled adhesion properties. The firmness and/or adhesion properties can be adjusted by controlling the wt % of the fibrillating particulate polymer that is used in a gum base of this invention. In general, however, the firmness of a gum comprising a gum base of this invention will be such that it requires a relatively more muscular effort to chew than most commercial gums. The additional muscular effort results in enhanced secretion of saliva, which provides a hygienic benefit to the chewer in the form or reduced bacterial activity in the mouth, reduction in the phenomenon of "bad breath" and alleviating some of the symptoms of digestive difficulties for people with ulcers or problems with excess stomach acidity. Further, the requirement of a relatively strong bite to chew a gum of this invention may serve as a substitute for other items that people habitually chew such as pencils, fingernails and the like.

While the preparation of firm texture chewing gums is not per se novel, such is usually accomplished by substantially increasing the amount of solid elastomer in the gum base. This contrasts markedly with the current invention, which achieves the same—and in many cases significantly better—result using a relatively small amount of a fibrillating PTFE polymer. That is, the amount of fibrillating polymer that is added to a gum base of this invention to provide all of the advantages disclosed herein is from about 0.1 wt % to about 20 wt %, preferably from about 0.2 wt % to about 10 wt % and currently most preferably from about 0.2 wt % to about 4 wt %. Even at these relatively low amounts, the fibrillating polymer of this invention gives gum firmness together with a pleasurable smooth, soft mouth-feel, which encourages people to continue chewing the gum despite the increased muscular effort required to do so. Further, the firm smooth and soft texture will last far longer than that achieved with most, if not all, gums currently on the market. In addition, it is expected that the pleasurable characteristics of a gum comprising a gum base of this invention should also encourage people to chew in a way that applies a direct massage-like pressure to the gums, enhancing blood flow resulting in beneficial effects on the health of the gums.

In general, without being held to any particular theory, it is believed that the high level of shear stress placed on the particulate polymers of this invention during chewing causes the polymer to fibrillate, which in turn increases the strength of the entire bolus of gum being chewed. By controlling the amount of the fibrillating polymer included in a gum base, the eventual overall strength that the gum achieves while being chewed can be varied within a relatively wide range. Thus, it is possible to manufacture different gum bases that will provide gums that exhibit different firmnesses and that require different amounts of muscular effort to chew to match people's preferences.

An additional benefit of a gum comprising a gum base of the present invention is that, when the fibrillating polymer selected is one of the presently preferred fluoropolymers, used boluses of the resulting finished gum will have a substantially reduced tendency to stick to surfaces of any type.

As mentioned previously, a particulate fibrillating polymer of this invention may be incorporated into a chewing gum base and finished gum in its particulate form, in which case it will fibrillate as the result of the user's chewing, or it may be fibrillated during the manufacturing process. In the latter case, it is preferable to add the gum base containing the fibrillated polymer of this invention to a commercial chewing gum formulation as discussed above. Since the amount of fibrillating polymer can be controlled by the thickness/weight of the thin layer disposed over the commercial formulation or the total weight of the bolus applied to or into the surface of the commercial formulation, it is possible to include a higher wt % of the particulate polymer in the gum base of this invention with the concomitant advantage of a more readily obtainable homogeneous dispersion than can be accomplished when attempting to disperse a relatively small amount of the fibrillating polymer into the gum base. Thus, while the presently preferred wt % of fibrillating polymer in a gum base of this invention is from about 0.2 wt % to about 4 wt %, for the purposes of preparing a gum base in which the particulate polymer is already fibrillated, the polymer may be incorporated in amount from a about 5 wt % to about 25 wt %. A non-limiting example of this is the mixing of a gum base polymer, polyvinyl alcohol, with 20 wt % of DuPont 60C fine powder PTFE using a roller mill such as a Hollander Beater. The shear stress applied to the 60C polymer by the "beaters" of the Hollander Beater cause the polymer to fibrillate and, in addition, the beating process incorporates air into the mixture, which aids in providing the gum base with a soft consistency and smooth texture. The relatively high wt % of the 60C in the mixture assures that, as a result of the beating process, the 60C will be homogeneously dispersed throughout the gum base.

The invention herein has been described and disclosed with reference to numerous specific embodiments. It is understood that the invention herein is not intended, nor is it to be construed, as being limited in any manner by such embodiments. For example, those skilled in the art will be able, based on the disclosures herein, to recognize additional embodiments not expressly set forth herein; all such embodiments are within the scope of this invention.

What is claimed:

1. The chewing gum base composition comprising gum base, comprising a biocompatible particulate polymer having an average particle size of about 200 μm to about 2,000 μm, wherein the particles fibrillate when subjected to a shear stress imposed by chewing, and, wherein the biocompatible particulate polymer comprises from about 0.2 wt % to about 4 wt % of the base.

2. The chewing gum base composition of claim 1, wherein the biocompatible particulate polymer is a fluoropolymer.

3. The chewing gum base composition of claim 2, wherein the fluoropolymer is poly(tetrafluoroethylene).

4. The chewing gum of claim 1, wherein a layer of the chewing gum base of claim 1 is disposed over at least a portion of a surface of a commercial chewing gum formulation.

5. The chewing gum of claim 1, wherein a bolus of the chewing gum base of claim 1 is disposed over or into a surface of a commercial chewing gum formulation.

6. The method comprising:
providing a chewing gum base polymer or mixture of polymers;
adding to the chewing gum base polymer or mixture of polymers from about 5 wt % to about 25 wt % of a biocompatible particulate polymer that fibrillates when subjected to a sheer force; wherein the biocompatible particulate polymer comprises particles of an average particle size of from about 200 μm to about 2,000 μm;
applying a shear force to the mixture of chewing gum base polymer or mixture of polymers and the biocompatible particulate polymer to form a substantially homogeneous dispersion of fibrillated biocompatible polymer in the chewing gum base polymer or mixture of polymers, wherein the biocompatible particulate polymer is a fluoropolymer.

7. The method of claim 6, wherein the fluoropolymer is poly(tetrafluoroethylene).

8. The method of claim 6, further comprising disposing a layer of the substantially homogeneous dispersion over at least a portion of a surface of a commercial chewing gum formulation such that the wt % of fibrillated biocompatible polymer is from about 0.2 wt % to about 10 wt % of the total weight of shaped commercial gum formulation plus the substantially homogeneous dispersion.

9. The method of claim 8, wherein the wt % of fibrillated biocompatible polymer is from about 0.2 wt % to about 4 wt %.

10. The method of claim 6, further comprising disposing a bolus of the substantially homogeneous dispersion on or into a surface of a commercial chewing gum formulation such that the wt % of fibrillated biocompatible polymer is from about 0.2 wt % to about 10 wt % of the total weight of shaped commercial gum formulation plus the substantially homogeneous dispersion.

11. The method of claim 10, wherein the wt % of the fibrillated biocompatible polymer is from about 0.2 wt % to about 4 wt %.

* * * * *